Figure 1:
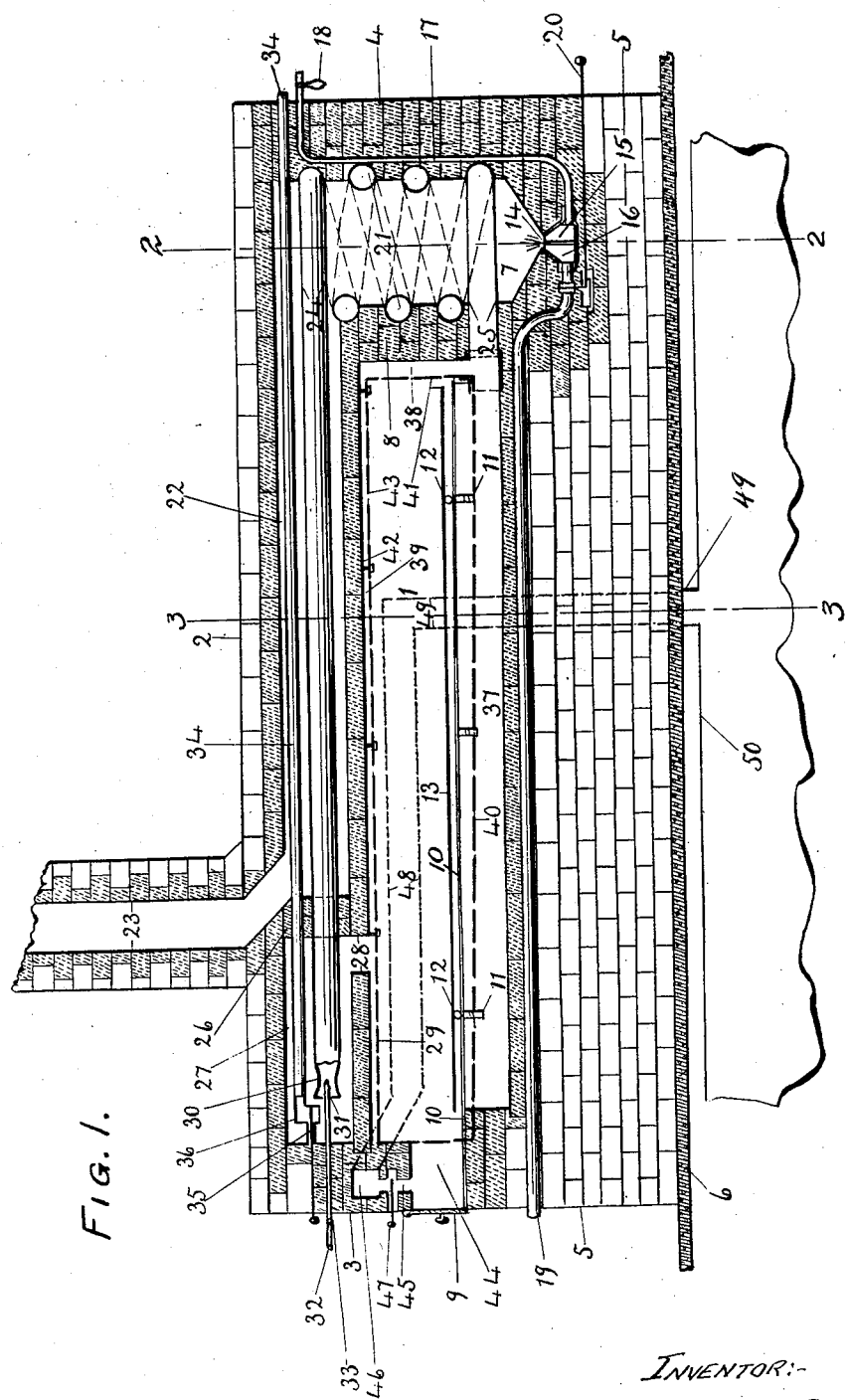

June 30, 1925.

L. C. REESE 1,544,481

BAKING BREAD AND OTHER ARTICLES

Filed March 4, 1922

2 Sheets-Sheet 1

Inventor:-
Louis Charles Reese

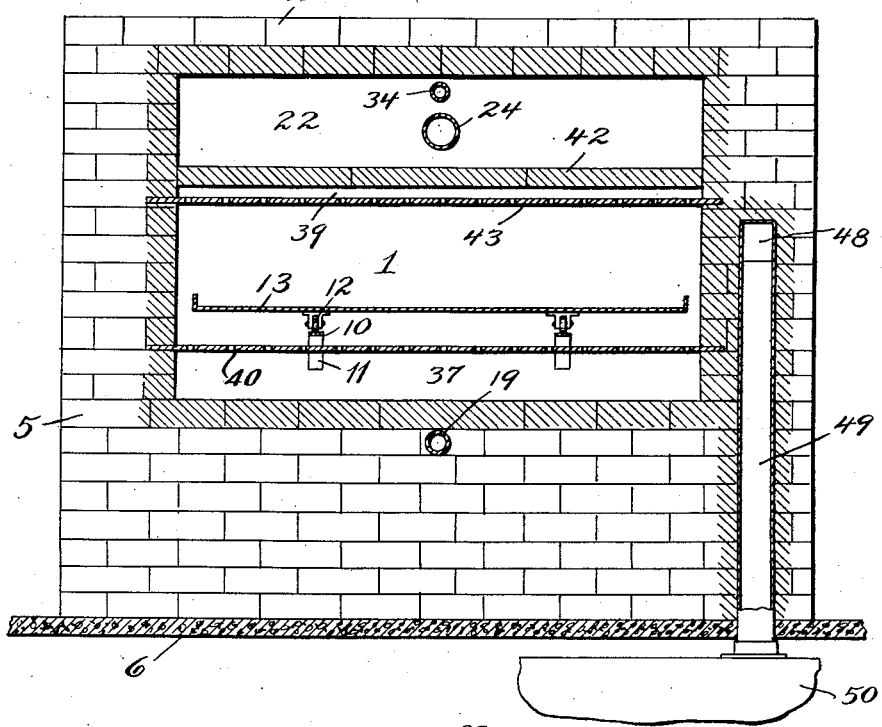
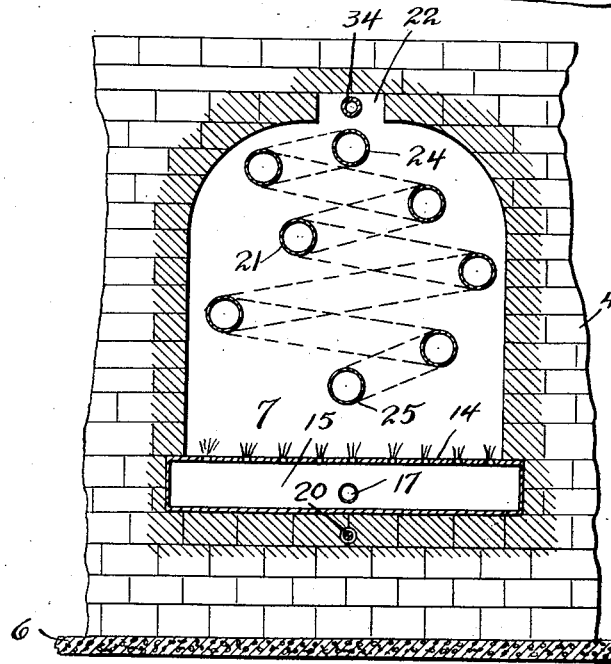

Patented June 30, 1925.

1,544,481

UNITED STATES PATENT OFFICE.

LOUIS CHARLES REESE, OF SAGINAW, MICHIGAN.

BAKING BREAD AND OTHER ARTICLES.

Application filed March 4, 1922. Serial No. 541,035.

To all whom it may concern:

Be it known that I, LOUIS CHARLES REESE, a declarant of intention of becoming a citizen of the United States, a resident of Saginaw, in the county of Saginaw and State of Michigan, have invented new and useful Improvements in Baking Bread and Other Articles, of which the following is a specification.

My invention relates to a new and improved method of an apparatus for heating ovens, in which bread and similar fermented dough articles, cakes, tarts, pastry, fruit and meat pies, roasts, hams, etc., etc. are baked, and has for its object to render the baking operation more accurate and efficient in regard to results, easier controlled, continuous and considerably less expensive.

According to the hitherto known methods of baking, the articles to be so treated are placed for the required time in the cavity of an oven, the baking chamber, heated either internally or externally to the temperature best suitable for the purpose. Bread, the main representative of this kind of goods, which—in comparison to the others—is produced in by far the largest quantities, is baked for about 45 minutes at 450 to 520° F.; smaller dough-products require a somewhat lower temperature and shorter time, and other articles as large cakes, pies, roasts, etc., also a lower degree of heat, but a longer time. As source of heat in these ovens wood-, coal- or coke fire, burning gas or oil, or electricity are employed. In modern commercial baking ovens the heat is supplied to the baking chamber either by means of flues surrounding the same and traversed by the hot fire gases produced in the furnace, or by inclined Perkins' tubes heated in the furnace at their lower ends and extending throughout the whole length and width of the baking chamber, or by electric heaters distributed in the latter. While baking takes place, the atmosphere inside the baking chamber is over-saturated with steam formed by the evaporation of a portion of the water contained in the articles under treatment; during this time, especially where the baking chamber is large in comparison to the volume of the articles being baked, additional steam is frequently introduced into the chamber from a boiler or produced within the latter, partly in order to equalize and soften the fierce heat imparted, and partly to prevent a too rapid and excessive evaporation of water from the articles.

According to my new method forming the object of this invention, I heat the baking chamber and bake the articles contained therein by circulating the atmosphere of this chamber with the addition of steam through a superheater where they obtain the temperature necessary for baking. I draw from the baking chamber by any suitable means, as a steam jet ventilator, fan or the like, the gaseous mixture,—mainly air and steam—forming its atmosphere, and force it by the same means together with the steam, to be introduced, added thereto through a superheater and back into the chamber, repeating and continuing this circulation until the baking operation has been completed. Suitable distributors serve for evenly spreading the fresh superheated gaseous mixture returning from the superheater within the baking chamber. If required, air or any other gaseous matter or matters may be added to the mixture drawn from the baking chamber, before the latter enters the superheater. The quantity of steam introduced, the proportion of the gaseous contents of the baking chamber circulated, and the amount of air or gaseous matters added are controlled by any convenient means. The waste heat escaping from the superheater is, where it is possible, used for heating one or several of the walls surrounding the baking chamber, and for preheating the gaseous mixture, coming from the baking chamber, and the steam, air or gaseous matter added thereto, before entering the superheater. In order to avoid in the baking chamber any appreciable pressure above that of the outside atmosphere, whereby the quality of the goods being baked might be affected, I provide an outlet channel for the escape from the baking chamber of the surplus of its gaseous contents, the amount leaving therethrough being regulated by any suitable means, and the end of the channel, open to the outside atmosphere, being situated in a plane beneath the bottom of the baking chamber, so that always the hottest and lightest components of its atmosphere are retained therein. The considerable amount of heat contained in the steam and the other gaseous matters escaping from the baking chamber is used with advantage in heating ovens requiring a lower temperature, proofing apparatus, drying chambers and the like.

The accompanying, more or less diagrammatical drawing serves for more fully explaining my new method of baking and demonstrates the principles, according to which the apparatus necessary for performing the same is constructed. The example described in the following and shown in the drawing is a bread baking oven, in which the superheater is heated by gas, and a steam jet ventilator is employed for supplying the steam to be introduced into the baking chamber and for circulating at the same time the atmosphere of the latter through the superheater.

Fig. 1 is a vertical longitudinal section of this oven, Fig. 2 a transverse section on line 2—2 and Fig. 3 a transverse section on line 3—3 of Fig. 1.

In the drawings the numeral 1 indicates the baking chamber, 2 the top part, 3 the front part, 4 the back part and 5 the bottom part of the oven, which surrounds the baking chamber 1 and is situated on the floor 6. The furnace 7 is enclosed in the back part 4 and separated by the intermediate wall 8 from the baking chamber 1. The latter is provided with the door 9 for charging and discharging and with rails 10 supported on iron beams 11 laid across the chamber and carrying on wheels 12 the movable plate 13, on which the articles to be baked are placed. The fuel used in the furnace 7 is gas; the burner 14 for the same, arranged at the bottom of 7, consists of two adjoining compartments: 15 for the gas and 16 for the air. The gas enters its compartment 15 through the pipe 17 provided with the regulating valve 18 and embedded in the wall, forming the back part 4 of the oven, as near as possible to the furnace 7 so that the gas passing through 17 is preheated. The air enters its compartment 16 through the tube 19 extending through the bottom part 5 of the oven to its front and provided with the throttle valve 20, worked by the usual lever arrangement, for regulating the quantity of air used in the burner 14; the arrangement of the tube 19 close underneath the hot baking chamber causes the air passing therethrough to be preheated.

The wide and voluminous body of the furnace 7, which—of course—is provided at the proper places with spy glass tubes to observe the flames of the burner, with lighting and cleaning doors and similar appliances necessary in this kind of firing arrangement, extends upwards, contains the superheater 21 and ends in the wide flue 22, through which the spent fire gases escape to the chimney 23. The superheater 21 is constructed in zig-zag fashion and supported by the side walls of the furnace 7. The mixture of steam and air to be heated enters through the tube 24 at the top and leaves by the tube 25 at the lower end of the superheater 21. The inlet tube 24 passes inside the flue 22 towards the outlet of the latter and then through the intermediate wall 26 into the suction chamber 27 situated in the front part of the oven top 2 and connected with the baking chamber 1 by the opening 28. For distributing over a large area the points, at which the gaseous contents of the baking chamber 1 are drawn into the suction chamber 27 through the opening 28, they are preferably forced to pass through a perforated plate 29 suspended from the ceiling of the chamber 1 and extending across its whole width and from its front to the farther end wall of the opening 28. The tube 24 ends in the neck 30 which, being first narrow then widening towards its end, is especially constructed to receive and act with the nozzle of the ordinary steam jet ventilator 31 adjustable in regard to the quantity of steam used therein and to the volume of the air or other gaseous matters drawn in thereby from the suction chamber 27. The steam is supplied to the ventilator 31 from a boiler (not shown) by the pipe 32, and its quantity entering the latter is controlled by the valve 33. The tube 34, the open end of which protrudes from the back part 4 of the oven, extends through the wall 4, the flue 22 and the intermediate wall 26 into the suction chamber 27 and serves to supply preheated fresh air to the same, when so desired. The slide valve 35 provided in the downward-bent branch 36 of the tube 34 controls the quantity of air passing into the suction chamber 27. The ventilator 31 drives the gaseous contents of the suction chamber 27, with addition of the steam used, into the tube 24, while the rarefaction thus created in the suction chamber 27 draws into the same the gaseous contents of the baking chamber 1 through the opening 28 and perforated plate 29, and, if desired, fresh air through the tube 34. This gaseous mixture, after having been preheated in the tube 24, enters the superheater 21, where it attains the temperature necessary for baking, and passes then through the outlet tube 25 into the channels 37 at the bottom, 38 at the back and 39 at the top of the baking chamber 1. The channel 37 is formed by the brick bottom of the latter and the perforated sheets 40 suspended from the beams 11, and the channel 38 by the back wall 8 and the perforated plate 41 extending upwards between the side walls of the chamber. The channel 38 is connected at its top to the channel 39, which extends nearly to the opening 28 and is formed by the ceiling 42 of the chamber 1 and the perforated plates 43 suspended therefrom. The perforations in the plates 40, 41 and 43, through which the duly heated mixture of steam and air enters the baking chamber 1, are the more numerous and the larger in area, the farther they are removed from the tube 25; in this way the hot gas mixture is evenly distributed within the chamber 1, and thereby the articles placed therein evenly baked.

For connecting in an oven of the class shown the interior of the baking chamber 1, while closed during baking, with the outside atmosphere, I preferably provide in the top of the opening 44 for the door 9 the outlet channel 45, which communicates with the channel 46 arranged across in the brickwork of the oven front 3 and is provided with the slide valve 47 for regulating the outflow. The escaping hot gases pass from the channel 46 through the horizontal channel 48 (shown in dotted lines) in the side walls of the chamber 1 and the downward channel 49 to the proofing chamber 50 situated on the floor below the oven described. (Only the top of the chamber 50 is shown in outline).

When the oven 1 is to be heated up for baking, the gas cock 18 and air valve 20 are opened and the gas lit in the furnace 7; as soon as the superheater 21 is sufficiently hot, the steam valve 33 is opened so as to supply the injector 31 with the due amount of steam for strong working, and the slide valve 47 so far as to avoid any overpressure in the baking chamber 1; the air valve 35 remains closed. In consequence of the rapid circulation thus obtained of its gaseous contents and the steam added thereto by the injector 31 through the well heated superheater 21, the baking chamber 1 reaches very soon the baking temperature, whereupon the steam is shut off by closing the valve 33, the door 9 is opened, and the articles to be baked are as quickly as possible placed on the hearth plate 13. It may be remarked here, that it is advantageous to open the valve 47 as wide as possible during the charging operation and also while removing the baked articles from the baking chamber. As soon as the charging has been completed and the door 9 closed, the steam valve 33 is opened again to restart the circulation; this valve, the outlet valve 47, the gas cock 18 and the air valve 20 leading the air to the burner are then set and regulated so as to produce such a velocity of the circulating current (which in general ought to be rather slow), and such an amount of heat transferred from the superheater to the gaseous mixture passing therethrough, that the baking chamber is maintained at the most favourable temperature for baking during the whole operation. In case it is required that the proportion of air in the atmosphere of the baking chamber is increased the slide valve 35 is opened accordingly. As soon as the baking has been finished, the steam valve 33 and the air valve 35, if the latter be used, are closed, the door 9 is opened, and the baked articles are quickly removed from the baking chamber 1 which is then immediately ready for a fresh batch to be baked as described before.

While I have shown in the drawing and described in the foregoing only a single construction for putting into effect the method of baking forming the object of my invention, still it will be understood that I do not limit myself in the practice of the said method to the described or any other construction, except as I may do so in the following claims.

I claim:

1. The method of baking which consists in withdrawing gaseous fluid from the baking chamber by the injector action of a jet of gaseous fluid under pressure, superheating the mixture of the gaseous fluid from the jet and of the gaseous fluid from the baking chamber, and returning the superheated mixture to the baking chamber.

2. The method of baking which consists in withdrawing gaseous fluid from the baking chamber by the injector action of a steam jet, superheating the mixture of steam and gaseous fluid from the baking chamber and returning the superheated mixture to the baking chamber.

3. The method of baking which consists in withdrawing gaseous fluid from the baking chamber by the injector action of a jet of gaseous fluid under pressure, adding another gaseous fluid, superheating the mixture of the gaseous fluid from the jet, of the gaseous fluid from the baking chamber and of the gaseous fluid added, and returning the superheated mixture to the baking chamber.

4. The method of baking which consists in withdrawing gaseous fluid from the baking chamber by the injector action of a jet of a gaseous fluid under pressure, superheating the mixture of the gaseous fluid from the jet and the gaseous fluid from the baking chamber, and returning the superheated mixture to the baking chamber, the pressure of the gases within the said baking chamber being kept during all the time at about that of the outside atmosphere.

5. The method of baking which consists in withdrawing a controlled portion of the gaseous fluid contents of the baking chamber from the latter by a jet of a gaseous fluid under pressure, superheating the mixture of the gaseous fluid from the jet and the gaseous fluid from the baking chamber, and returning the superheated mixture to the baking chamber.

6. In a baking oven, in combination a baking chamber enclosed therein, a superheater, a furnace, in which the latter is heated, an opening in the said baking chamber, a channel connecting the said opening with one end of the said superheater, a second opening in the said baking chamber, a channel connecting the said second opening with the opposite end of the said superheater, and a power-driven ventilator so arranged in the first named channel and so adapted as to draw the gaseous contents of the said baking chamber into the same, and to drive them then through the rest of this channel, the superheater, and the second named channel back into the said baking chamber.

7. In a baking oven, in combination a baking chamber inclosed therein, a superheater, a furnace, in which the latter is heated, an opening in the said baking chamber, a channel connecting the said opening with one end of the said superheater, a second opening in the said baking chamber, a channel connecting the said second opening with the opposite end of the said superheater, and a steam jet ventilator so arranged in the first named channel as to draw the gaseous contents from the said baking chamber into the same and to drive them then together with the steam forced from the nozzle of the said ventilator through the rest of the first named channel, the said superheater and the second named channel back into the said baking chamber.

8. In a baking oven, in combination a baking chamber enclosed therein, a superheater, a furnace for heating the latter, an opening in the said baking chamber, a channel connected at one end to the said superheater, a suction chamber enclosing the other end of the said channel and the said opening, a tube open at both ends, protruding with one end from the oven in the free atmosphere and extending with its other end into the said suction chamber, means provided to regulate the amount of gaseous matter passing through the said tube, a second opening in the said baking chamber, a channel connecting the latter opening with the opposite end of the said superheater, and means so arranged and so adapted as to draw the gaseous contents of the said chamber through the first named opening, and gaseous matter through the said tube into the said suction chamber, and the mixture of both from there into the first named channel and to drive it then through the latter, the superheater and the second named channel back into the said baking chamber.

9. In a baking oven, in combination a baking chamber enclosed therein, a superheater, a furnace for heating the latter, a flue leading the used firegases from the said furnace along the said baking chamber into a chimney, an opening in the said baking chamber, a channel connected at one end to the said superheater and passing through the said flue, a suction chamber enclosing the other end of the said channel and the said opening, a second opening in the said baking chamber, a channel connecting the latter opening with the opposite end of the said superheater, and means so arranged and so adapted as to draw the gaseous contents of the said baking chamber through the first named opening into the said suction chamber and from there into the first named channel, and to drive them then through the latter, the superheater and the second named channel back into the said baking chamber.

10. In a baking oven, in combination a baking chamber enclosed therein, a superheater, a furnace for heating the latter, an opening in the said baking chamber, a channel connecting the said opening with one end of the said superheater, a second opening in the said baking chamber, a channel connecting the latter opening with the opposite end of the said superheater, an adjustable steam jet ventilator so arranged in the first named channel as to draw a portion regulated thereby of the gaseous contents from the said baking chamber and to drive it mixed with the steam used through the first named channel, the superheater, and the second named channel back into the said baking chamber, a third opening in the latter, a channel connected to this opening and ending in the open air below the bottom of the said baking chamber, means for regulating the amount of surplus gases escaping from the latter through the last named opening, and an apparatus enclosed in the last named channel for using the heat contained in the gases passing therethrough.

LOUIS CHARLES REESE.